United States Patent [19]

Storms

[11] 4,169,059
[45] Sep. 25, 1979

[54] AUTOGENOUSLY BONDED FILTER ASSEMBLIES

[75] Inventor: Ronald L. Storms, Hamburg, N.J.

[73] Assignee: Brunswick Corporation, Skokie, Ill.

[21] Appl. No.: 916,216

[22] Filed: Jun. 16, 1978

Related U.S. Application Data

[62] Division of Ser. No. 758,130, Jan. 10, 1977, Pat. No. 4,114,794.

[51] Int. Cl.² ............................................. B01D 29/06
[52] U.S. Cl. ........................... 210/493 R; 29/163.5 F; 55/497; 55/525; 210/496; 210/497 R; 210/499
[58] Field of Search ................. 29/163.5, 419; 55/497, 55/525–527, 501; 210/487–491, 493 R, 496, 510, 403 B, 497

[56] References Cited

U.S. PATENT DOCUMENTS

| | | | |
|---|---|---|---|
| 3,057,481 | 10/1962 | Pall | 210/510 X |
| 3,092,581 | 6/1963 | Jaffe | 210/510 |
| 3,165,473 | 1/1965 | Pall et al. | 210/510 |
| 3,379,000 | 4/1968 | Webber et al. | 57/139 |
| 3,426,910 | 2/1969 | Winzer | 210/493 |
| 3,504,422 | 4/1970 | Thalman | 210/496 X |

*Primary Examiner*—Charles N. Hart
*Assistant Examiner*—Richard W. Burks
*Attorney, Agent, or Firm*—John G. Heimovics

[57] ABSTRACT

An autogenous or sinter bond between metallic filter media and other metal components of a filter assembly is produced by joining the parts through a diffusion bonding membrane. The membrane comprises a web of small diameter metal fibrils which will sinter bond to both the filter media and the other filter parts to form a physically strong and leak-free seal.

9 Claims, 4 Drawing Figures

AUTOGENOUSLY BONDED FILTER ASSEMBLIES

CROSS-REFERENCE TO CO-PENDING APPLICATIONS

This application is a divsional application of co-pending application Ser. No. 758,130 filed Jan. 10, 1977 now U.S. Pat. No. 4,114,794.

BACKGROUND OF THE INVENTION

This invention relates to filters having a porous metallic filter media suitable for the mechanical filtering of both liquids and gases and to a method for their manufacture. More particularly, this invention relates to the bonding of other metal components to a metallic filter media to form a filter assembly.

Metallic filter media typically comprise very finely woven screen, usually utilized in a plurality of superposed layers, or a sintered web or mat of metal fibrils. Often a rather coarse metal screen is placed on either side of a metal fibril web to provide physical protection and to increase the strength of the web. Filters employing metallic media find extensive use in high temperature or corrosive environments.

Construction of filter assemblies containing metallic filter media presents difficult problems in bonding the porous medium to the connecting solid components. It is necessary to obtain a strong, leak-free joint between the parts in order to obtain a useful and reliable filter. The solid components of a filter assembly typically comprise end plates or caps in the case of a filter medium of cylindrical shape and a confining ring or housing in the case of a flat, or pack, filter.

A number of techniques have been proposed and are used to bond metallic filter media to connecting components of a filter assembly. Adhesives such as the epoxies have been used for this purpose, but the resulting filter assembly is limited to relatively low temperature applications.

For high temperature applications, bonding is usually accomplished by brazing, fusion welding or resistance welding. While brazing can produce strong, leak-free bonds, this technique is beset with problems. The metallic filter media, being porous, displays a strong capillary action toward the molten brazing metal. Consequently, brazing metal migrates from the joint area into the filter media reducing the effective filter area and often preventing the formation of uniform fillets. Additionally, the brazing metal is of different composition than that of the filter media and of the other metal components of the filter assembly. In some corrosive environments, this will cause localized electrolytic corrosion and early failure.

Brazing also requires a short time-temperature cycle which effectively rules out furnace brazing techniques. Brazing of stainless steel filter media requires temperatures in excess of the oxidation point thus necessitating use of either an inert atmosphere or a protective flux. If a protective flux is used, it must be subsequently removed and this is an operation which is both costly and unreliable.

Both resistance welding and fusion welding are complicated by the difference in effective thickness between the filter media and the relatively massive metal components to which it is joined. The excessive heat employed by use of these techniques tends to fuse a portion of the filter media, and so reduce its effective filtering area, or to distort the metal components of the filter assembly. Heat distortion is often so extensive as to require machining of the welded assembly to obtain the desired finished dimensions. In addition, the machining step may introduce undesirable metal particulates into the downstream portion of the filter assembly.

Lastly, it has been proposed to attach metal strips over the edges of the filter media by means of crimping or welding and thereafter fusion welding the metal strip to the filter end plates. This technique is disclosed in U.S. Pat. No. 3,426,910. While this joining method produces a reliable seal between the media and the other metal components making up the filter assembly, it does result in the loss of effective filter area particularly in the case of relatively short, cylindrical filters. Moreover, this joining technique is not adaptable for use with a flat, or pack filter.

SUMMARY OF THE INVENTION

Metallic filter media are joined to other metal components of a filter assembly by sinter bonding the media to the metal components through a diffusion bonding membrane. The diffusion bonding membrane comprises a web of metal fibrils which is metallurgically compatible with both the filter media and the other metal components. In a preferred embodiment, the filter media, the diffusion bonding membrane and the other metal components of the filter assembly are of identical composition.

The diffusion bonding membrane is placed between the filter media edges and the metal components. Thereafter, the assembly is sintered, preferably in a vacuum furnace, at a temperature below the melting point of the metals for a time sufficient to develop a sinter bond between the filter media and the bonding membrane and between the bonding membrane and the other metal components of the filter assembly.

Hence, it is an object of this invention to provide a process for the joining of metallic filter media to other metal components.

It is another object of this invention to provide filter assemblies in which the filter media is metallurgically bonded to other metal components making up the assembly.

Yet another object of this invention is to sinter weld metallic filter media to other metal components of a filter assembly.

A specific object of this invention is to sinter bond metallic filter media to other metal components through use of a metal fibril, diffusion bonding membrane.

DISCUSSION OF THE INVENTION

Metallic filter media, including very finely-woven metal screen and sintered, metal fibril webs, may be sinter bonded to more massive metal filter components by means of a diffusion bonding membrane. The diffusion bonding membrane comprises a thin web of metal fibrils which have the ability to readily sinter to an adjoining metal part at high temperature. Composition of the metal fibrils making up the bonding membrane must be metallurgically compatible with both the filter media and the metal component parts making up the finished filter assembly. By metallurgical compatibility is meant the ability to form a strong sinter or autogenous bond at a temperature where at the shape and properties of the component parts of the filter assembly are unaffected. Metallurgical comparability is most readily obtained by using the same metal or alloy for the filter media, the bonding membrane and the other metal component parts of the assembly.

Appropriate metals for use in the filter assemblies of this invention include the stainless steels, Inconel, Hastalloy, the nickel-base super alloys and various iron, nickel and cobalt-base alloys. Of these metals, the stainless steels find the most general application.

The diffusion bonding membranes of this invention may be fabricated from the same metal fibrils as are used to manufacture sintered metal fibril webs used as filter media. The fibrils themselves may have a diameter in the range of 2-40 microns and a length in the general range of ½ to 6 inches. In most instances the smaller fibrils, those having a diameter of about 4 to 16 microns and a length of ½ to 1 inches, are preferred. The fibrils may be produced, for example, for example, by the process described in the Webber et al patent, U.S. Pat. No. 3,379,000. Metal fibrils produced by other known processes may be used as well.

Metal fibril compacts suitable for use as the diffusion bonding membranes of this invention may be fabricated from the fibrils in the following manner. First, a loose mat of uniformly dispersed, randomly oriented intertwining metal fibrils is formed. This mat is then compressed to increase its density. The compressed mat is next annealed to relieve stresses and reduce its elasticity. Thereafter, the annealed web is rolled to obtain a bonding membrane of the desired thickness. The finished sheets or membranes display a high degree of physical integrity but must be protected against dents and nicks which could prevent proper sintering of the seal during fabrication of the filter elements.

The loose, metal fibril mats used in making bonding membranes may be prepared by introducing separated fibrils into an upwardly moving stream of high velocity air by which they are transported into contact with a downwardly-facing reticulated web. Fibrils build up on the web and form a mat of interlaced, randomly dispersed fibrils. This mat has a low density, on the order of 1% of the density of an equivalent volume of solid metal, but has sufficient strength for subsequent handling. Procedures and apparatus for mat forming are disclosed in greater detail in U.S. Pat. No. 3,505,038. Additionally, metal fibril mats of a variety of metal alloys are commercially available under the trade designation, "Brunsmet Web."

It is desirable that the diffusion bonding membranes be of low to intermediate density so that they can deform sufficiently to conform to any irregularities of the filter media edges. At the same time, it is necessary that the membranes be sufficiently dense to provide a strong, leak-free seal. A density in the range of about 5% to 40%, based on the density of an equivalent volume of solid metal, is generally appropriate. It is preferred that the density be in the range of about 15% to 25%.

The diffusion bonding membranes are desirably quite thin, generally in the range of about 0.005 to 0.05 inches in thickness. However, membrane thickness is not particularly critical as multiple membrane layers can be used. A membrane thickness of 0.02 to 0.03 inches is appropriate and works well for stainless steel filter assemblies.

Fabrication and bonding techniques, using the diffusion bonding membranes of this invention, are quite simple. In the case of a short, cylindrical or "pancake" type filter, the filter assembly typically consists of the filter media bonded between a pair of end plates. The filter media may comprise a plurality of superposed, finely-woven screens or a sintered, metal fibril compact either alone or with relatively coarse facing or backup screens on either side of the compact. The filter medium is preferably folded into a pleated configuration, formed into a cylindrical shape and welded to form a closed loop.

The diffusion bonding membrane is cut to conform in size and shape with the end caps. Final assembly is accomplished by placing a bonding membrane inside one of the end caps and carefully locating the filter media on the membrane and centered within the end cap. Care must be taken to insure that the filter media edge is in complete contact with the bonding membrane. Thereafter, the other end cap and bonding membrane is placed on the filter media again being sure of complete contact. The assembly is then compressed as in a punch press to densify the bonding membrane and force it into the filter media at all points of contact.

Diffusion bonding of the filter media to the end caps through the bonding membrane is accomplished by sintering the assembly at a temperature below the melting point of the metals for a time sufficient to form an autogenous or sinter bond. Sintering temperature is tailored to the metals used in the filter assembly. Appropriate sintering temperatures for stainless steels, for example, are about 2000° F. to 2200° F. for a time of about 1 to 3 hours. It is preferred to carry out the sintering step in a vacuum. After sintering is complete, it is preferred to cool the filter assembly quickly by backfilling the vacuum furnace with a reducing gas such as hydrogen.

In the case of a pack-type filter, which comprises a filter media fitted within a confining ring or housing, the procedure is similar. The filter media is cut to be slightly undersize relative to the housing. A strip of bonding membrane having a width slightly greater than the height of the filter media is then wrapped around the filter media and the excess is trimmed off. The filter media is then compressed and forced into the housing using an arbor press or similar device. Expansion of the filter media tends to densify the bonding membrane at all points of contact. Thereafter, the filter assembly is subjected to sintering conditions for a time sufficient to develop a strong, leak-free autogenous or sinter bond between the filter media and the housing through the bonding membrane.

DESCRIPTION OF EXEMPLARY EMBODIMENTS

The objects and features of the invention will become more clearly apparent upon a review of the following description in conjunction with the accompanying drawing in which.

Figure 1:
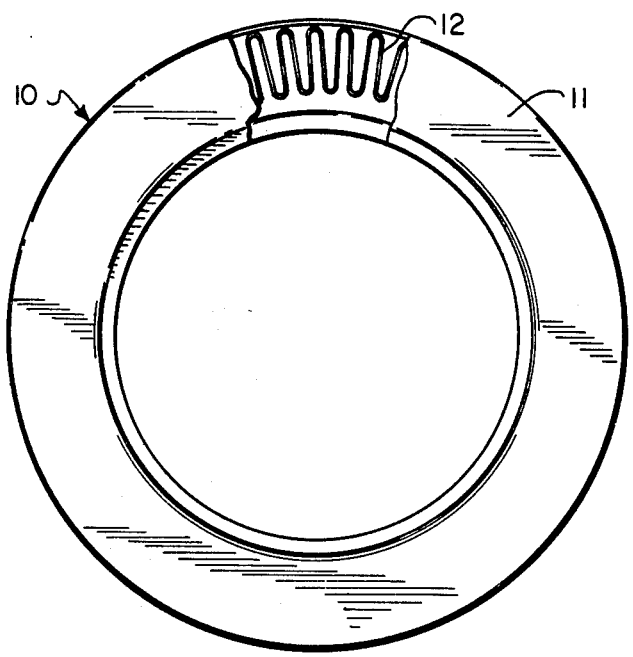
FIG. 1 is an end view of a cylindrical or "pancake" filter assembly with parts broken away and in section.

Referring now to FIG. 1, there is shown one embodiment of a filter assembly 10 in which one end plate 11 has been partially broken away to show the pleated configuration of filter media 12. Media 12 may comprise multiple, superposed layers of finely-woven metal screening, a sintered metal fibril web or a sintered metal fibril web faced with a relatively coarse metal screen.

Figure 2:
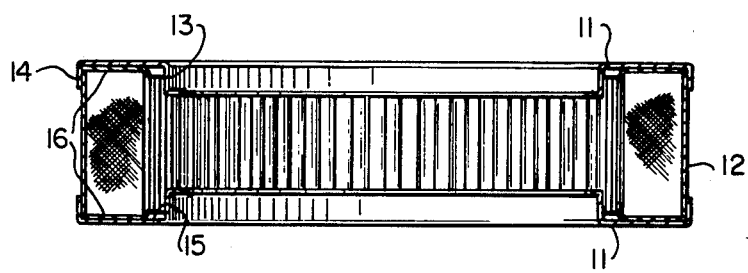
FIG. 2 is a cross-sectional side view of the structure of FIG. 1.

End plates 11 are of annular shape having an inner cylindrical wall portion or rim 13 and an outer cylindrical wall portion or rim 14. Rims 13 and 14 define an annular channel 15 into which filter media 12 fits. This is best illustrated in FIG. 2.

Filter media 12 is attached to end plates 11 by a strong, leak-free sinter bond through bonding membrane 16. Membrane 16 comprises a flat, annular ring fabricated from a metal fibril web having metallurgical compatability with both the metallic filter media 12 and the metal end plates 11.

Figure 3:
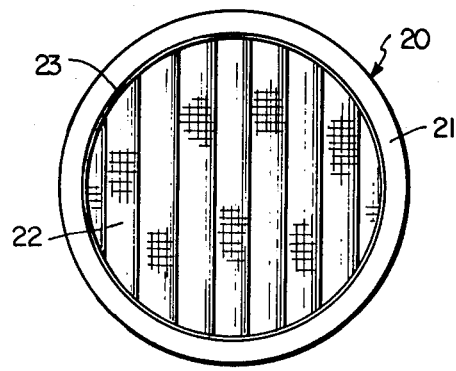
FIG. 3 is a plan view of a pack-type filter assembly.
Figure 4:
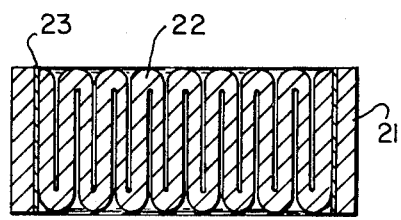
FIG. 4 is a cross-sectional side view of the structure of FIG. 3.

FIGS. 3 and 4 illustrate another filter assembly constructed in accordance with the teachings of this invention. The filter assembly 20 comprises an exterior ring or housing 21 which confines a metallic filter media 22. As is shown in FIG. 4, media 22 is preferably of folded or pleated configuration. Media 22 wrapped with the bonding membrane 23 is sized to produce a compressive fit within housing 21. As in the embodiment of FIG. 1, filter media 22 may comprise multiple superposed layers of finely-woven screening, a sintered metal fibril web or a sintered metal fibril web faced with a relatively coarse metal screen.

Bonding membrane 23 surrounds media 22 and forms a juncture between the media and housing 21. Membrane 23 comprises a strip of metal fibril web having a composition such that it will form a autogenous or sinter bond between the metallic filter media 22 and the metal housing 21. Metallurgical compatability between the media and the membrane and between the membrane and the housing is best assured by fabricating all three elements of the same metal such as the same stainless steel. The sinter bond developed between media 22 and housing 21 through membrane 23 has great physical strength and provides a permanent, leak-free seal.

The following examples more clearly illustrate specific embodiments of the invention.

EXAMPLE 1

Diffusion bonding membranes were prepared from webs of stainless steel metal fibrils. The metal fibrils were obtained in the form of a commercially available web having nominal fibril diameters of 4, 8 and 12 microns and sold under the trade designation "Brunsmet".

Layers of the Brunsmet web were stacked together to obtain the desired membrane thickness and density. The stacked layers were then passed through a rolling mill set at a gap of 0.010 inches. Thereafter, the resulting sheet was annealed in a vacuum furnace at a temperature of about 1800° F. for a time at temperature of about 10 minutes. The furnace was then cooled as quickly as possible using a hydrogen purge. The annealed sheets were again rolled to a thickness of about 0.025 inches to produce a finished diffusion bonding membrane which displayed a density of about 20% as compared to the density of an equivalent thickness of the same stainless steel. Strips and annular shapes were cut from the membrane and were used to sinter bond stainless steel filter media to stainless steel end plates and housings to produce filter assemblies such as those illustrated in the drawing.

EXAMPLE 2

A cylindrical filter assembly such as that illustrated in FIGS. 1 and 2 was constructed using the diffusion bonding membrane of Example 1 to sinter bond the filter media to the end plates. The filter media consisted of a sintered stainless steel fibril web faced on both sides with a 50 mesh stainless steel screen. The filter media was seam welded to form a continuous loop and was pleated or folded as shown in FIG. 1 so as to obtain a large effective filtering area within a relatively small space.

End plates of the same stainless steel were cleaned well in a solvent and a diffusion bonding membrane conforming in size and shape to the bonding surface of the end plates was placed inside one of the end plates. The pleated filter media was carefully centered on the bonding membrane and the remaining end plate and bonding membrane were then assembled. The assembly was then compressed in a punch press using a fixture to maintain concentricity and height. This pressing operation densified the bonding membranes and tended to force the membranes into the filter media at all points of contact.

The assembly was then transferred to a vacuum sintering furnace taking care to avoid any movement of one part relative to another. Alignment of the end caps was maintained using a fixture compatible with sintering temperatures and the assembly was weighted with approximately 5 lbs. Thereafter, the assembly was sintered for 2 hours at 2200° F. followed by rapid cooling using a hydrogen flush. The resulting sinter bond between the end plates and the filter media was leak-free and of great physical strength.

EXAMPLE 3

A pack-type filter assembly such as that illustrated in FIGS. 3 and 4 was constructed using the diffusion bonding membrane of Example 1 to sinter bond the filter media to a cylindrical housing. The filter media again consisted of a sintered stainless steel fibril web faced on both sides with a stainless steel screen and formed in a pleated configuration as illustrated in FIG. 4. The media was cut to a circular shape having a diameter slightly smaller than the inner diameter of the stainless steel housing.

A strip of bonding membrane prepared as in Example 1 was cut to a width about ¼ inch greater than the media pleat height and to a length ½ inch greater than twice the circumference of the filter media. One end of the membrane was feathered by tearing off about ¼ inch of material. Starting with the feathered end, the bonding membrane was tightly wrapped for two full turns around the filter media. The exposed end of the membrane wrapping was also feathered by tearing off another small length of material. Excess membrane was then trimmed from the assembly making the membrane wrap equal to the pleat height of the filter media.

The membrane wrapped filter media was then inserted in a compressed state into the housing using a die and arbor press. Thereafter, the assembly was transferred to a vacuum furnace and was sintered at 2000° F. for two hours. After sintering was complete, the assembly was quickly cooled using hydrogen to flush the furnace. The sintered filter assembly displayed a strong, leak-free autogenous bond between the filter media and the housing.

It is to be understood that the specific embodiments disclosed herein are exemplary in nature. Other embodiments of this invention will be apparent to those having skill in the art.

I claim:

1. A filter adapted to filter fluids comprising:
 (a) a solid metal housing and;
 (b) a metallic filter media located in the housing; and (c) a bonding membrane seal comprising a web of small diameter fibrils having metallurgical compatability with both the filter media and the housing and located therebetween, the web autogenously bonded to the housing and the filter media providing a leak-free seal between the housing and the media thereby providing channeled fluid flow only through the filter media.

2. The filter of claim 1 wherein said metal fibrils have a diameter in the range of 2 to 40 microns and a length in the range of ½ to 6 inches.

3. The filter of claim 2 wherein said membrane has a porosity in the range of 60% to 95% and a thickness in the range of 0.005 to 0.05 inches.

4. The filter of claim 3 wherein said filter media comprises multiple superposed layers of finely woven metal screen of the same composition as said membrane and arranged in a pleated configuration.

5. The filter of claim 3 wherein said filter media comprises sintered metalfibril web of the same composition as said membrane and arranged in a pleated configuration.

6. The filter of claim 5 wherein said metal fibril web is faced on both sides with a coarser woven screen.

7. The filter of claim 3 wherein said filter media is cylindrical in shape and is arranged in a pleated configuration and wherein a pair of end plates are autogenously bonded to the media ends through said diffusion bonding membrane.

8. The filter of claim 3 wherein said filter media is of circular disc shape contained within and autogenously bonded to a cylindrical metal housing.

9. The filter of claim 8 wherein said filter media is arranged in a pleated configuration.

* * * * *